May 20, 1958 — H P. KAREN — 2,835,108
VARIABLE AREA FLAMEHOLDER FOR AFTERBURNER
Filed July 17, 1951 — 3 Sheets-Sheet 1
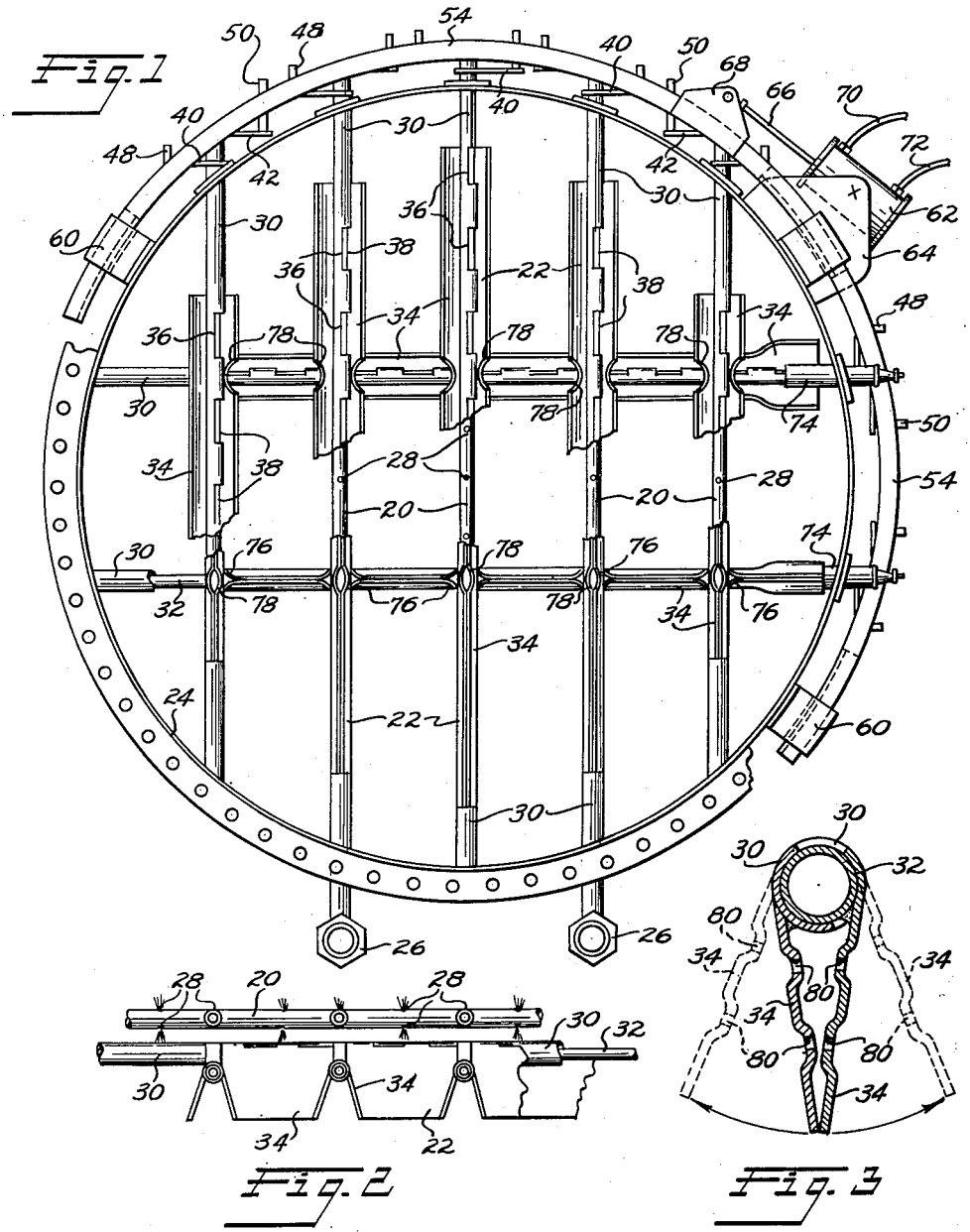
INVENTOR
H. PETER KAREN
BY Strauch, Nolan & Diggins
ATTORNEYS May 20, 1958     H P. KAREN     2,835,108
VARIABLE AREA FLAMEHOLDER FOR AFTERBURNER
Filed July 17, 1951     3 Sheets-Sheet 2

INVENTOR
H. PETER KAREN
BY Strauch, Nolan & Diggins
ATTORNEYS

May 20, 1958  H P. KAREN  2,835,108
VARIABLE AREA FLAMEHOLDER FOR AFTERBURNER
Filed July 17, 1951  3 Sheets-Sheet 3

INVENTOR
H. PETER KAREN

BY Strauch, Nolan & Diggins
ATTORNEYS

United States Patent Office 2,835,108
Patented May 20, 1958

2,835,108

VARIABLE AREA FLAMEHOLDER FOR AFTERBURNER

H Peter Karen, San Diego, Calif., assignor to Solar Aircraft Company, San Diego, Calif., a corporation of California Application July 17, 1951, Serial No. 237,213

5 Claims. (Cl. 60—39.72)

This invention relates to improvements in burners, and has particular reference to variable solidity burners for use in the afterburner component of a jet engine power plant.

At the present time afterburners are being increasingly used in all types of jet power plants to supplement the thrust forces developed by the primary jet engine. The afterburner accomplishes this thrust augmentation by injecting fuel into the exhaust gases passing therethrough from the primary engine and burning the resulting fuel-gas mixture. The fuel is usually injected under pressure from some kind of a fuel manifold which in certain types of afterburners is in the form of a fuel grid. In order to maintain stable combustion the afterburner must also be provided with some form of sheltered combustion zone in which a pilot flame may be maintained to spread combustion to the mixture of fuel and gases passing at high velocity through the afterburner. Without such a sheltered combustion zone it would be impossible to initiate and maintain stable combustion in the extremely rapid flow of exhaust gases.

Because afterburning consumes additional fuel, the afterburner is presently used in aircraft power plants primarily as a safety or emergency expedient and is generally turned off during cruising periods to conserve the fuel. Thus, the afterburner is normally used only when additional power is required for combat maneuvers or during take-offs, or in special instances such as after a wave-off during a carrier landing. This, of course, means that the afterburner is in its off or no-burning condition more than it is on even though the primary engine exhaust gases continue to pass through the afterburner duct to the atmosphere.

The fact that the exhaust gases from the primary engine pass through the afterburner structure even though that structure is not being used to augment the reactive thrust of the gases gives rise to one of the most difficult problems connected with the use of afterburners. The problem arises because the afterburner structure needed to insure efficient afterburning performance necessarily imposes a certain amount of solid matter in the path of the flowing gases, thereby causing drag and subsequent thrust losses. This problem has existed as long as afterburners have been in use and despite much experimentation in the aircraft field no satisfactory solution has heretofore been found which will materially reduce thrust losses and still permit top afterburner performance. Accordingly since the afterburner is continuing to play an ever more important part in the safety and effectiveness of jet powered aircraft, it will be apparent that a practical solution to the problem of afterburner solidity will be an important contribution to the art.

The subject invention provides such a solution with a novel variable solidity burner construction so that the burner structure in the afterburner duct can be varied to present materially reduced solid matter to the exhaust gases during periods of no-burning. With this construction the drag caused by the solid matter and resultant thrust losses are substantially reduced promoting greater jet engine efficiency during the periods that the afterburner is not in use. The means to control the variable burner construction embodied herein are simple and practical and may be conveniently coordinated with other jet engine components such as, for example, the variable nozzle to reduce the number of controls the operator must look after. The invention is also capable of use in several different types of afterburners, and with slight modification can be used to advantage in ram jet engines.

With these and other considerations in view, it is a primary object of this invention to provide a variable solidity burner which will enable increased overall jet engine efficiency.

It is another object of the invention to provide a burner for jet engine afterburner having a variable solidity construction to decrease drag and subsequent thrust losses during periods of no-burning.

A further object of the invention is to provide a variable solidity burner having a simple and reliable control system.

Another object of the invention is to provide a variable solidity burner capable of use in many types of jet engine power plants.

Other objects and advantages will become apparent from the following detailed description in conjunction with the accompanying drawings, and from the appended claims.

The accompanying drawings in which like reference numerals are used to designate similar parts throughout, illustrate the preferred embodiments for the purpose of disclosing the invention. The drawings, however, are not to be taken in a limiting or restrictive sense since it will be apparent to those skilled in the art that various changes in the illustrated construction may be resorted to without in any way exceeding the scope of the invention.

In the drawings:

Fig. 1 is a side elevation of a variable solidity burner embodying one form of the invention;

Fig. 2 is a plan view of a fragmentary portion of the burner of Fig. 1;

Fig. 3 is a detail view of a flameholder trough showing its extreme alternative positions;

Figure 4:
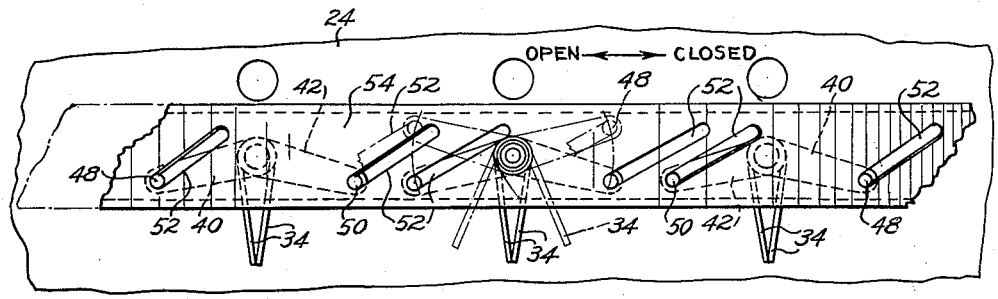
Figs. 4 and 5 are detail views of a portion of the flameholder control means.
Figure 5:
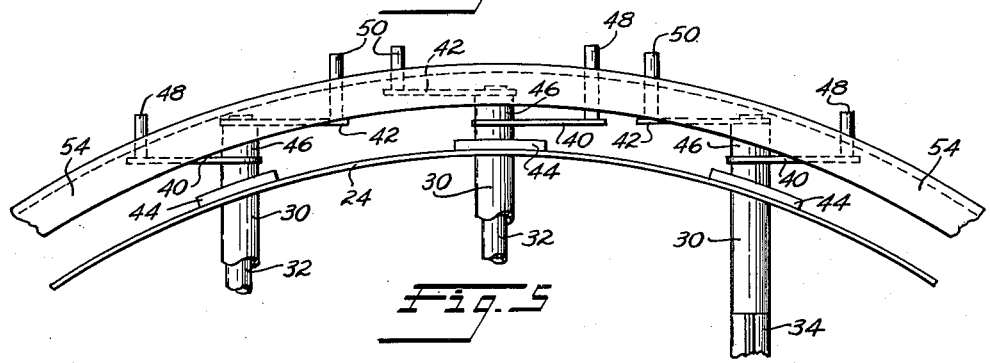

Referring now to the drawings, Figs. 1–5 illustrate one form of the invention as applied to a grid type of afterburner. In this type of afterburner the burner comprises a fuel manifold or grid 20 and a flameholder grid 22 downstream thereof, both mounted in a burner shell or housing 24. Shell 24 is ordinarily connected at its upstream side to a diffuser section (not shown) which is in turn connected to the primary engine tailpipe. At its downstream side shell 24 is connected to an afterburner tailpipe (not shown) which is usually provided with a suitable variable nozzle for reasons well-known in the art.

The fuel manifold 20 consists of a grid of coplanar communicating horizontal and vertical fuel conducting pipes although other grid configurations may be satisfactorily employed. The manifold may be mounted in the shell 24 in the manner described in copending application Serial No. 140,633, filed January 26, 1950, by Robert E. Day now Patent 2,701,444, so that expansion may take place in the manifold without causing permanent deformation thereto. As shown in Fig. 1 two of the fuel pipes extend beyond the shell 24 and are provided with connectors 26 for securing them to conduits leading from the fuel source. The fuel thus pumped into manifold 20 under pressure will be ejected therefrom in the form of fuel jets from the orifices 28 in the grid fuel pipes. The majority of the orifices 28 are located in the upstream sides of the fuel pipes, although some may also face downstream as shown in Fig. 2.

The flameholder grid 22 is located immediately downstream of the fuel manifold 20 and comprises an interconnecting coplanar network of flameholder troughs or gutters of substantially V-shaped cross-section. As shown in Fig. 1 flameholder grid 22 has a configuration like that of fuel manifold 20 but other configurations may also be used. In accordance with the invention, each flameholder trough comprises two hollow tubes 30 and 32, one within the other, with one side 34 of the trough secured as by welding to each tube. In order that this be possible outer tube 30 is cut away at equal intervals along its length as shown at 36, Fig. 1, so that extensions 38 on one of the sides 34 can extend through the cutaway portions 36 and be secured to inner tube 32. With this hinged arrangement it will be understood that sides 30 of the troughs can be brought together or spread apart as desired. One of the troughs with its sides 34 in their extreme positions is shown in Fig. 3, the solid lines showing the completely closed position and the dash lines showing the fully open position.

To control the positioning of the trough sides 34 lever arms 40 and 42 are rigidly secured to extensions of the tubes 30 and 32 respectively. In the illustrated embodiment these extensions pass through the shell 24 at the top and right sides of the shell for the vertical and horizontal troughs respectively of flameholder grid 22. The opposite ends of tubes 30 and 32 are mounted for pivotal movement in suitable bushings in shell 24 and do not extend beyond it. As may be best seen from Fig. 5 shell 24 is reinforced where tubes 30 and 32 pass through it by plates 44 welded to the shell. Plates 44 may also serve as bushings; close clearances are maintained to preserve a gas tight seal. The lever arms 40 and 42 extend from tubes 30 and 32 in opposite directions and are separated by a spacing collar 46. Each of the lever arms 40 has a pin 48 mounted on its outward end, while arms 42 are similarly provided with pins 50.

The ends of the pins 48 and 50 are received in slots 52 in an arcuate channel member 54 spaced from and partially encircling shell 24 as shown in Fig. 1. Channel 54 is supported for limited rotary movement about the axis of the shell by means of tracks 60 suitably secured to the shell as by welding. When channel 54 is moved clockwise to its extreme position in the clockwise direction pins 48 and 50 will be positioned at the forward ends of slots 52 as shown in Fig. 4 and the sides 34 of the flameholder troughs will be fully closed. Movement of channel 54 in the opposite direction will cause the pins to be moved to the positions shown in phantom lines in Fig. 4 to open the trough sides 34. It should be understood here that the slots 52 will not as a practical matter be all parallel because of the varying slope of the channel 54 with respect to pins 48 and 50. The important point is to secure equal movements in all the troughs, and this might also be accomplished with slightly curved slots 52.

The channel member 54 may be moved between its limiting positions by a pneumatic, hydraulic or electrical power unit, or a combination of them. In the illustrated embodiment a pneumatic actuator is shown comprising an air working cylinder 62 mounted above the channel 54 by means of a bracket 64 suitably secured to shell 24. An extension of the cylinder rod 66 is connected to a bracket 68 integral with channel 54. The inlet and exhaust lines for cylinder 62 are shown at 70 and 72; these may be connected in the usual manner to the aircraft compressed air supply. The control of the flameholder trough may be fully variable so that the trough sides 34 may be positioned in any intermediate position as well as in the fully open and fully closed positions. This control may also be coordinated with the variable nozzle control to obtain automatic adjustment of burner solidity and nozzle area for all conditions of afterburning under widely varying flight conditions.

When the afterburner is turned on the flameholder troughs will be positioned in their fully open position and fuel will be pumped into manifold 20 from which it will be ejected in a pattern of fuel sprays through orifices 28. This fuel will be mixed with the exhaust gases from the primary engine and a portion of the resulting mixture will eddy about and enter the open troughs of the flameholder grid 22 in the usual manner. The mixture thus entering into the troughs is ignited by a pair of high-tension spark plugs 74 extending into the horizontal troughs through shell 24 as shown in Fig. 1. The trough sides 34 are curved outwardly adjacent the spark plugs 74 so that they will completely enclose the plugs when in their fully closed position. Ordinarily the spark ignition circuit may be cut off after a few seconds of afterburning since once ignited the fuel-gas mixture in the troughs will maintain a sheltered pilot flame which will serve to spread combustion to the remaining mixture passing between the troughs and maintain stable afterburner combustion.

As illustrated in Fig. 1 the sides 34 of the horizontal troughs are cut on a bevel at 76 adjacent the vertical troughs so that the sides of the latter may be opened out. In fully open position sides 34 of the vertical troughs will abut the beveled cuts 76 of the horizontal troughs. Semi-circular cuts 78 are provided as shown in the sides 34 of the vertical troughs so that all the troughs may be intercommunicating. The trough sides 34 may also be provided with orifices 80, Fig. 3, so that some of the fuel gas mixture impinging upon the sides and becoming vaporized thereby may enter into the troughs through the orifices to support the sheltered pilot flames anchored therein.

From the lower portion of Figure 1 and the plan view of Figure 4 it will be seen that when the flameholder troughs are fully open the amount of solid matter obstructing the passage of gasses through the shell or duct 24 is very much greater than when the troughs are fully closed. This added solid matter does not do any particular harm during afterburning since the open trough sides 34 are beneficial in slowing down the rapidly moving fuel-gas mixture which allows better mixing and ripening of the fuel-gas particles. On the other hand, when the afterburner is turned off the solid matter is a decided disadvantage because, as pointed out hereinbefore, the solid matter offers resistance and creates drag in the escaping primary engine exhaust gases which at that time are supplying the total propelling thrust force. Thus the invention by providing means for varying the solidity of the burner allows the flameholder troughs to present a nearly airfoil cross-section to the oncoming exhaust gases when the afterburner is off, and thereby materially decreases the resistance to the gases and enables greater efficiency of performance than has been possible heretofore with the non-variable or fixed type burner grid construction.

Figure 6:
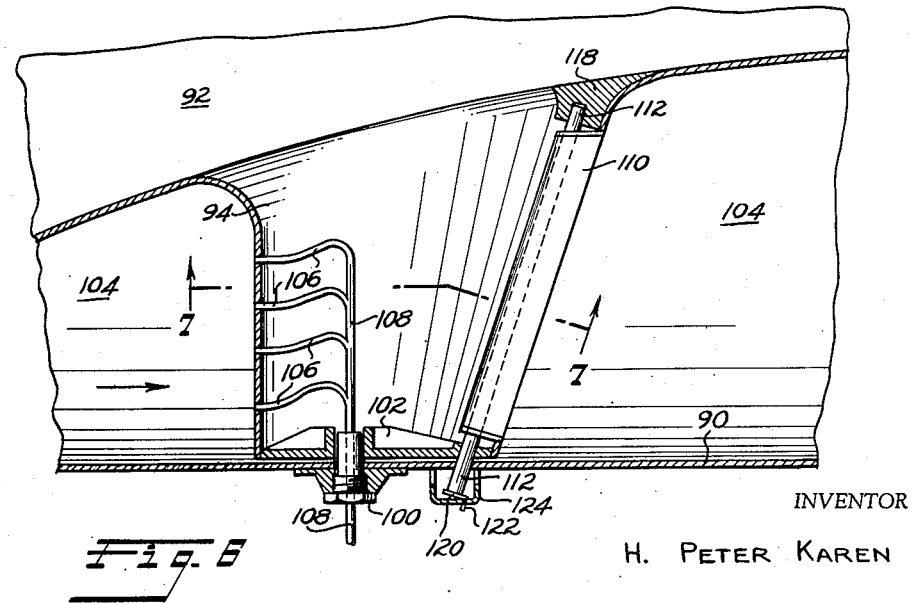
Fig. 6 is a side elevation of a variable solidity burner embodying another form of the invention.
Figure 7:
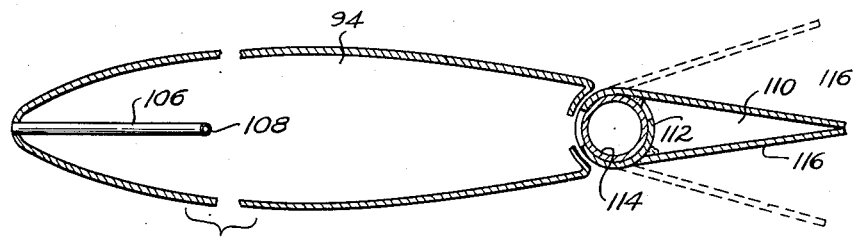
Fig. 7 is a sectional view taken along line 7—7 of Fig. 6.
Figure 8:
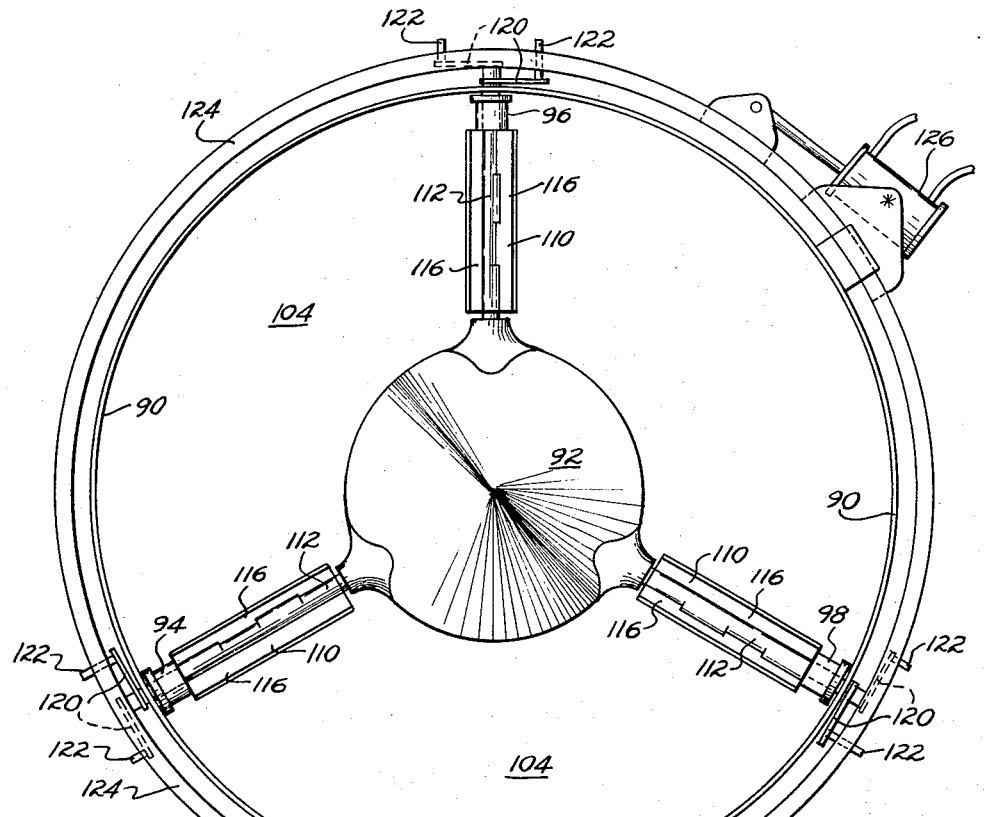
Fig. 8 is an end elevation of the burner of Fig. 6.

Figs. 6-8 illustrate another embodiment of the invention as applied to a different type of afterburner construction. In this form of the invention the afterburner is integrated with the struts of a jet engine inner tail cone assembly which provides downstream fairing for the expansion turbine hub of the primary engine. This assembly comprises an outer shell 90 suitably secured to the primary engine (not shown) and an inner hollow tail cone 92 supported in the shell 90 by means of three struts 94, 96 and 98 integral with inner cone 92 and spaced at 120° intervals around its periphery. Cone 92 and supporting struts 94, 96 and 98 are held in position in shell 90 by means of bolts 100 which are threaded into the shell and which have smooth end shanks that are received in the smooth bores of bridging brackets 102, one of which is secured across the end of each strut. This provides a three point radial sliding connection between the strut ends and the shell 90 enabling free radial displacement between the inner cone 92 and the shell in response to differential temperature changes but prevents longitudinal shift of the inner cone.

Afterburner fuel is introduced under pressure into the annular passage 104 between shell 90 and inner cone 92 by means of fuel conduits 106 in the upstream edge of each of the struts 94, 96 and 98. Conduits 106 communicate with a feeder tube 108 which passes through the bolt 100 and is connected with the fuel supply source (not shown). In this manner, the fuel is injected upstream to mix with the primary engine exhaust gases and produce a combustible mixture.

A flameholder trough 110 is mounted in the downstream edge of each of the struts 94, 96 and 98. Troughs 110 are constructed in the same manner as the troughs of the flameholder grid 22 in the first described modification and comprise outer and inner hollow tubes 112 and 114, respectively, having one of the trough sides 116 secured to each tube. Tubes 112 and 114 are pivotally mounted at their inner ends in a bushing 118. The outer ends of the tubes are extended through shell 90 as shown in Fig. 6, and a lever 120 is rigidly secured to each tube. Lever arms 120 are provided with pins 122 which are received in slots (not shown) of an annular channel member 124 all in the manner previously described. In this modification the channel member completely encircles shell 90 as may be seen from Fig. 8 but is moved like the arcuate channel member 54 by means of the actuator 126 to cause the opening and closing of trough sides 116.

When the afterburner is turned on the fuel is ejected from conduits 106 and the troughs 110 are moved to open position. A portion of the fuel-exhaust gas mixture will be deflected by the opened trough sides 116, eddy about the downstream edges thereof and enter into the troughs where it may be ignited by a high-tension spark plug (not shown) or other suitable means to initiate the burning of a pilot flame. The pilot flame in turn will spread combustion to the remaining mixture which will be ready for stable combustion by the time it is adjacent the troughs 110 since the fuel-gas particles will have had adequate time for thorough mixing and ripening in travelling from the initial mixing zone upstream of the struts to that point.

When the afterburner is turned off the fuel is cut off and the troughs 110 closed to the position shown in solid lines in Fig. 7. As will be seen from this figure, when the troughs 110 are in closed position the struts present a streamlined airfoil cross-section to the rapidly moving primary engine exhaust gases, and no obstructions are present to cause drag or increase the resistance to the gases. Since no structure other than the struts 94, 96 and 98 is present in this form of the invention, it will be apparent that very efficient performance is enabled during periods of no afterburning. The form of invention just described is particularly useful when power plants of short length are desired, such as for nacelle mounted engines.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within meaning and range of equivalency of the claims are therefore to be embraced therein.

What is claimed and desired to be secured by United States Letters Patent is:

1. In a jet engine, a duct having an inlet and outlet for receiving and discharging a stream of rapidly moving gases; a fuel manifold in said duct to inject fuel into said gases; first and second sets of substantially coplanar trough assemblies in said duct downstream from said fuel manifold and extending generally transversely of said duct, each of said trough assemblies comprising a pair of concentric tubes and a side member secured to each of said tubes and extending downstream thereof, said second set of trough assemblies being substantially coplanar with and normal to said first set of trough assemblies, means for rotating said tubes about their axes to thereby swing said side members to vary the width of said trough assemblies, the side members of one set of trough assemblies being cut away to receive the side members of the other set whereby the trough assemblies of said first and second sets intersect.

2. The assembly as defined in claim 1 wherein said means for rotating said concentric tubes comprises a member movably mounted externally of said duct, means for moving said member in a direction normal to the axis of said duct, and means connecting said member to each of said tubes.

3. The combination defined in claim 1 wherein the side members of said other set of trough assemblies are cut away adjacent the intersection with said one set of trough assemblies whereby said first and second sets of trough assemblies are in communication.

4. In a jet engine afterburner duct, a burner structure comprising pairs of concentric tube members in said duct generally transversely thereof, said pairs of tube members being substantially coplanar, means journalling all of said tube members in said duct for rotation about their longitudinal axes; a substantially flat plate-like side member carried by each of said tube members, the pairs of said side members attached to the respective pairs of tube members forming sheltered combustion zones in said duct; fuel supply pipes mounted in fixed positions in said duct a predetermined distance upstream of said tube members, said pipes extending transversely of said duct and being aligned axially of said duct with the respective pairs of side members and having fuel outlet openings spaced along their length to introduce fuel into said duct in regions upstream of each of said sheltered combustion zones; and means for rotating all of said tube members simultaneously in equal amounts about their longitudinal axes to thereby swing said side members equally about the axes of their associated tube members and thereby symmetrically vary the size of the sheltered combustion zones defined by each of said pairs of members while maintaining said predetermined spacing between each of said sheltered combustion zones and the adjacent fuel supply pipes.

5. The combination according to claim 4 together with an inner tail cone in said duct, a plurality of strut members to support said tail cone in said duct, the openings in said fuel supply pipes being positioned adjacent the leading edge of said strut and said tube members being supported adjacent the trailing edges of said struts.

References Cited in the file of this patent

UNITED STATES PATENTS

| 1,539,717 | Coppus | May 26, 1925 |
| 1,978,127 | Downs | Oct. 23, 1934 |
| 2,294,579 | Sherman | Sept. 1, 1942 |
| 2,508,420 | Redding | May 23, 1950 |
| 2,566,373 | Redding | Sept. 4, 1951 |
| 2,572,723 | Hildestad | Oct. 23, 1951 |
| 2,610,464 | Knoll | Sept. 16, 1952 |
| 2,689,680 | Lovesey | Sept. 21, 1954 |
| 2,707,372 | Cleveland | May 3, 1955 |

FOREIGN PATENTS

| 922,032 | France | Jan. 20, 1947 |